UNITED STATES PATENT OFFICE.

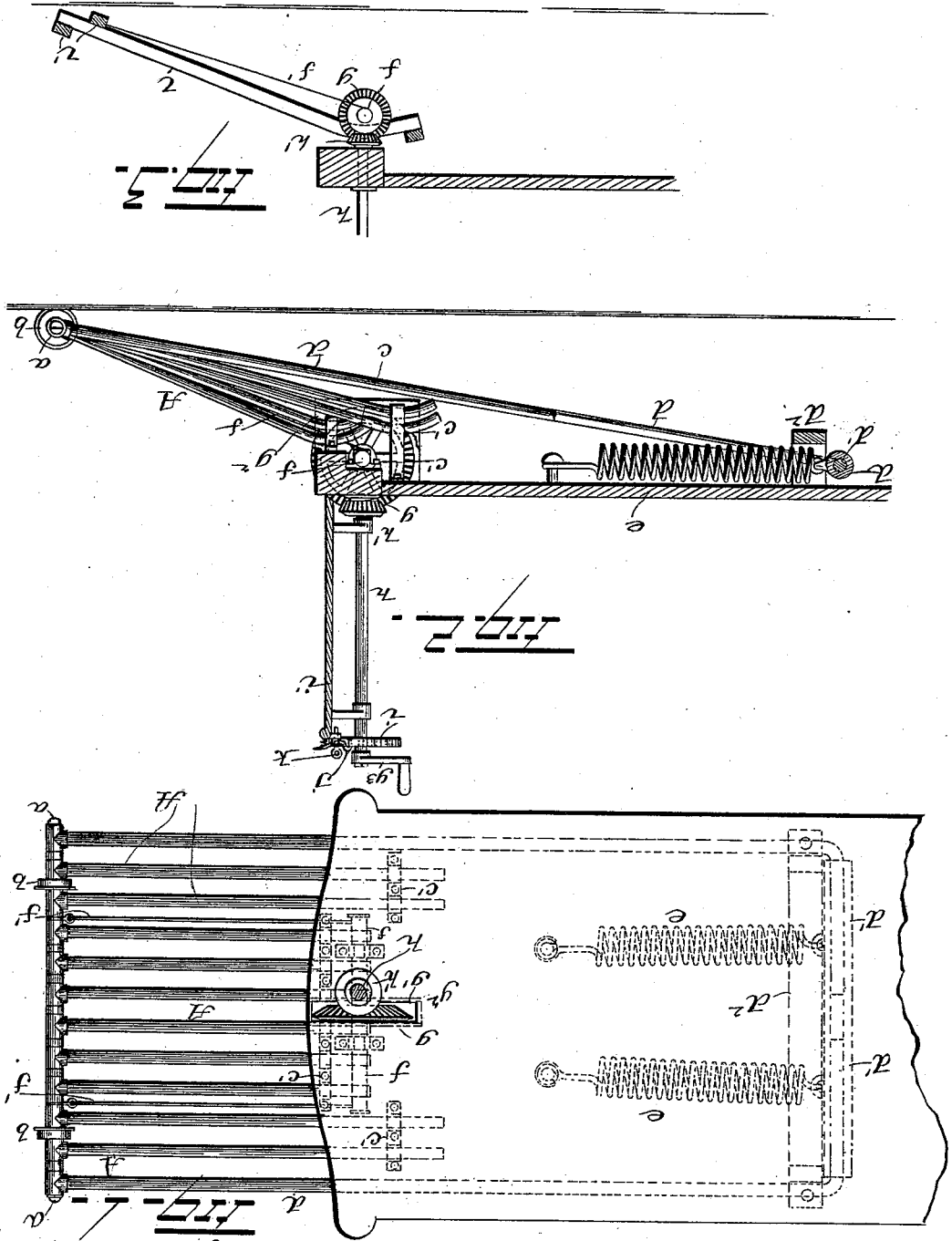

WILLIAM B. GEORGE, OF COLUMBUS, OHIO.

CAR-FENDER.

SPECIFICATION forming part of Letters Patent No. 539,050, dated May 14, 1895.

Application filed December 6, 1894. Serial No. 531,032. (No model.)

*To all whom it may concern:*

Be it known that I, WILLIAM B. GEORGE, a resident of Columbus, in the county of Franklin and State of Ohio, have invented certain new and useful Improvements in Car-Fenders; and I do hereby declare the following to be a full, clear, and exact description of the invention, such as will enable others skilled in the art to which it appertains to make and use the same.

My invention relates to an improvement in car fenders, the object of the invention being to produce a car fender which shall be simple in construction, capable of being withdrawn under the car when not in use and to be easily and quickly projected when occasion requires, and one which shall be effectual, in all respects, in the performance of its functions.

With these objects in view the invention consists in certain novel features of construction and combinations and arrangements of parts as hereinafter set forth and pointed out in the claims.

In the accompanying drawings, Figure 1 is a bottom plan view showing the application of my improvements to a car. Fig. 2 is a longitudinal sectional view. Fig. 3 is a view of a modification.

My improved fender comprises a series of bars A pivotally connected at their forward ends to a cross bar $a$ and on the latter wheels $b, b$ are mounted and adapted to run on the car tracks.

The fender bars A are bent downwardly at their rear ends, as at $c$, and pass loosely through guides $c'$ secured to the car bottom or the platform of the car, and when the fender is in its normal inoperative position, said bars A will lie flat against or in close proximity to the car bottom.

When the fender is forced forwardly in a manner hereinafter explained, the bars A will turn in the guides $c'$ at the bent portions of said bars and thus permit the free end of the fender to be lowered onto the track.

Some of the intermediate bars of the fender are preferably made shorter than the bars on the sides of the fender and passed through guides located nearer the end of the car or the platform thereof than the guides through which the lateral bars of the fender pass, so that when the fender is disposed in operative position the intermediate portion thereof will be more elevated than the lateral portions, whereby, when an obstruction is met with, it will be thrown laterally from the tracks.

To the ends of the cross bar $a$, two long, parallel rods or bars $d$ are pivotally connected, said bars or rods extending rearwardly under the car and connected loosely with a transverse sleeve $d'$, which latter is adapted to bear against a bracket $d^2$ secured to the car. Springs $e$ are attached at one end to the sleeve $d'$ and after passing forwardly through the bracket $d^2$, are connected at their forward ends to the car, said springs serving to quickly project the fender when the latter is released.

A transverse shaft $f$ is disposed under the platform of the car and over the fender and on this shaft, cords (or chains) $f'$ are wound, the forward ends of said cords or chains being secured to the cross bar $a$ of the fender. A gear wheel $g$ having lateral gear teeth, is secured to the shaft $f$, said gear wheel being adapted to project through a slot $g'$ in the platform of the car and also between two bars of the fender, being protected from conflict with said bars by a suitable shield $g^2$. A vertical shaft $h$ is mounted on the platform of the car and at its lower end carries a pinion $h'$ to mesh with the gear wheel $g$. The upper end of the shaft $g$ is provided with a crank arm $g^3$ by means of which to turn it. A perforated plate $i$ is also secured to the shaft $g$, and to the dash board $i'$ of the car a dog $j$ is pivoted and adapted to enter one of the perforations in the plate $i$ whereby to prevent the shafts $f, h$ from turning.

To prevent tampering with the device by malicious persons during the absence of the motorman, a pin $k$ will be passed through one of the perforations in the plate $i$ and made to enter a socket in the dash board, when the car is at rest.

From this construction and arrangement of parts it will be seen that when the fender is in its working position and it is desired to draw it up under the car, it is simply necessary for the motorman to rotate the shaft $h$ by the crank arm $g^3$, whereupon motion will be imparted to the shaft $f$ and the cords or chains $f'$ will be wound thereon, thus causing the fender to be pulled under the car, where it will be retained by the engagement of the dog $j$ with the perforated plate $i$. When it is desired to project the fender, the motorman will operate the dog $j$ to release it from the plate $i$, whereupon the springs $e$ will act to quickly project the fender and cause it to assume its operative position.

In the form of my invention above described, the bars of the fender are made of metal, but they need not necessarily be made of such material. Said fender may be made of wooden bars $l$ as shown in Fig. 3 and the bars connected together by means of cross bars $l'$ said bars $l$ being made with curved rear ends.

The fender may be disposed over the transverse shaft $f$ as shown in Fig. 3, instead of over said shaft as shown in Fig. 2.

Various other slight changes might be made in the details of construction without departing from the spirit thereof or limiting its scope and hence I do not wish to limit myself to the precise details of construction herein set forth, but, Having fully described my invention, what I claim as new, and desire to secure by Letters Patent, is—

1. The combination with a car, of a car fender having a sliding hinged connection with the under side of the car floor, the first outward movement of the fender being in a plane parallel to the car bottom and the next movement being in the arc of a circle, and means for moving the fender in and out, substantially as set forth.

2. The combination with a car, of a fender having a sliding connection with the car, said fender having a curved rear end whereby the outer end swings in the arc of a circle when the fender is projected, and means for moving the fender in and out, substantially as set forth.

3. The combination with a car, of a fender having a sliding connection with the car, said fender composed of parallel bars curved at their rear ends whereby after a limited outward movement the fender swings in the arc of a circle, and means for moving the fender in and out, substantially as set forth.

4. The combination with a car, of a fender composed of several bars, the central bars shorter than the side ones and all of said bars curved at their rear ends whereby the outer end of the fender swings in the arc of a circle when the fender is moved outward and the central bars assume a higher plane than the outer ones when the fender is in its projected position, and means for moving the fender in and out, substantially as set forth.

5. The combination with a car, of a fender composed of parallel bars, the central bars shorter than the outer bars and the two sets having a hinged or pivotal connection with each other and all the bars curved at their rear ends whereby the fender swings at its outer end in the arc of a circle, and means for moving the fender in and out, substantially as set forth.

6. In a car fender, the combination with a car and a cross bar, of a series of fender bars having downwardly bent rear ends, said bars being pivotally connected at their forward ends to said cross bar and the intermediate fender bars being shorter than the lateral fender bars, guides secured to the car for the lateral fender bars and guides for the intermediate fender bars secured to the car in advance of said first-mentioned guides, substantially as set forth.

7. In a car fender, the combination with a car and a cross bar, of a series of fender bars pivotally connected at their forward ends to said cross bar, said fender bars being adapted to lie parallel with each other under the car, and means for projecting the fender bars, said fender bars being so constructed and connected with the car that when the fender is projected the forward ends of the fender bars will approach the track and the intermediate fender bars be disposed above the lateral fender bars, substantially as set forth.

In testimony whereof I have signed this specification in the presence of two subscribing witnesses.

WILLIAM B. GEORGE.

Witnesses:
H. C. CHAPIN,
CHARLES H. TAYLOR.